(12) United States Patent
Oguro et al.

(10) Patent No.: US 11,148,666 B2
(45) Date of Patent: Oct. 19, 2021

(54) VEHICLE CONTROL APPARATUS

(71) Applicant: HONDA MOTOR CO., LTD., Tokyo (JP)

(72) Inventors: Hiroshi Oguro, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 16/626,070

(22) PCT Filed: Jun. 27, 2017

(86) PCT No.: PCT/JP2017/023581
§ 371 (c)(1),
(2) Date: Dec. 23, 2019

(87) PCT Pub. No.: WO2019/003302
PCT Pub. Date: Jan. 3, 2019

(65) Prior Publication Data
US 2020/0398838 A1 Dec. 24, 2020

(51) Int. Cl.
*B60W 30/165* (2020.01)
*B60W 30/16* (2020.01)

(52) U.S. Cl.
CPC ........ *B60W 30/165* (2013.01); *B60W 30/162* (2013.01); *B60W 2554/4041* (2020.02); *B60W 2554/4046* (2020.02)

(58) Field of Classification Search
CPC ............... B60W 30/165; B60W 30/16; B60W 50/0097; B60W 2554/4041;
(Continued)

(56) References Cited

U.S. PATENT DOCUMENTS 5,594,414 A * 1/1997 Namngani ............... G01P 15/00
340/436
6,628,227 B1 * 9/2003 Rao ....................... G01S 15/876
342/70
(Continued)

FOREIGN PATENT DOCUMENTS

ES 2377923 T3 * 4/2012 ............. B60L 58/12
JP 11-278099 A 10/1999
(Continued)

OTHER PUBLICATIONS

PCT/ISA/210 from International Application PCT/JP2017/023581 with the English translation thereof.
(Continued)

*Primary Examiner* — Behrang Badii
*Assistant Examiner* — Jalal C Coduroglu
(74) *Attorney, Agent, or Firm* — Carrier Blackman & Associates, P.C.; Joseph P. Carrier; Jeffrey T. Gedeon

(57) ABSTRACT

The present invention relates to a vehicle control apparatus least a partial automatic control over the travel of the host vehicle. A following variable generating unit (96) calculates a predicted position of an other vehicle at a predicted time point ahead of the present time point, sets a target position which is short of the predicted position by a target intervehicle distance, and determines a first following variable for causing the host vehicle to reach the target position at the predicted time point.

5 Claims, 12 Drawing Sheets

(58) Field of Classification Search
CPC ....... B60W 30/162; B60W 2554/4046; B60W 2720/10; B60W 2554/802; B60W 2754/30; B60T 2201/02
See application file for complete search history.

(56) References Cited

U.S. PATENT DOCUMENTS

| | | | |
|---|---|---|---|
| 2006/0149455 A1* | 7/2006 | Sawada | B60T 7/22 701/96 |
| 2007/0067085 A1* | 3/2007 | Lu | B60T 8/172 701/70 |
| 2009/0088925 A1* | 4/2009 | Sugawara | B60W 30/12 701/41 |
| 2010/0299044 A1* | 11/2010 | Miyake | B62K 11/007 701/96 |
| 2011/0224868 A1* | 9/2011 | Collings, III | G07C 5/0808 701/33.4 |
| 2015/0153733 A1* | 6/2015 | Ohmura | G05D 1/0061 701/23 |
| 2016/0297447 A1* | 10/2016 | Suzuki | B60W 30/18163 |
| 2017/0008528 A1* | 1/2017 | Nakatsuka | B60W 50/10 |
| 2017/0036679 A1* | 2/2017 | Takeda | B60W 40/04 |
| 2017/0120909 A1* | 5/2017 | Iwa | B60W 30/12 |
| 2017/0120912 A1* | 5/2017 | Ishioka | B60W 40/04 |
| 2018/0025643 A1 | 1/2018 | Yamamoto | |

FOREIGN PATENT DOCUMENTS

| | | | | |
|---|---|---|---|---|
| JP | 2002-264688 A | | 9/2002 | |
| JP | 2004-164188 A | | 6/2004 | |
| JP | 2006-193095 A | | 7/2006 | |
| JP | 2006188155 A | * | 7/2006 | ............... B60T 7/22 |
| JP | 2009244985 A | * | 10/2009 | ............ B60W 30/16 |
| JP | 4366419 B2 | | 11/2009 | |
| JP | 2015-093590 A | | 5/2015 | |
| JP | 2015108860 A | * | 6/2015 | ........... G05D 1/0061 |
| JP | 2016-145016 A | | 8/2016 | |
| WO | WO-2007018188 A1 | * | 2/2007 | ............. B62D 6/003 |
| WO | 2009/069410 A1 | | 6/2009 | |
| WO | WO-2014006770 A1 | * | 1/2014 | ............ B60W 30/16 |
| WO | WO-2015052865 A1 | * | 4/2015 | ...... B60W 30/18163 |
| WO | WO-2015118570 A1 | * | 8/2015 | ............ B60W 30/16 |

OTHER PUBLICATIONS

Office Action dated Jan. 5, 2021 issued over the corresponding Japanese Patent Application No. 2019-526434 with the English translation thereof.

* cited by examiner

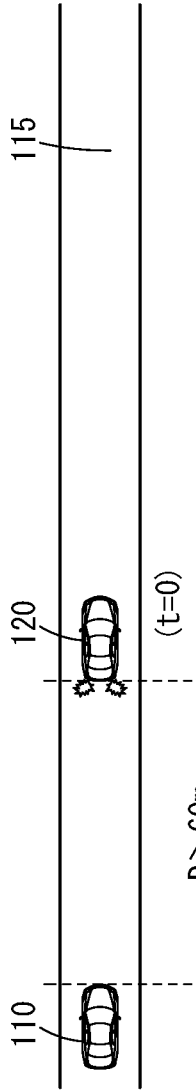
FIG. 8A (COMPARATIVE EXAMPLE)
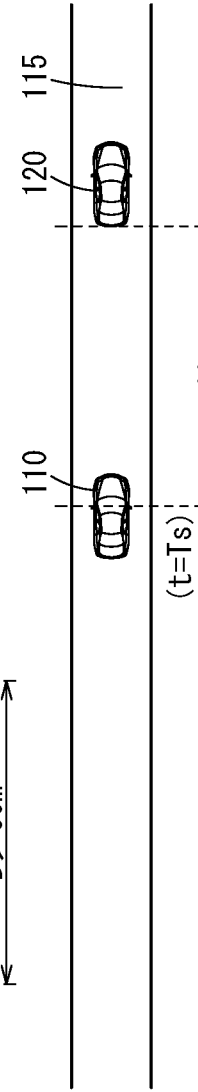
FIG. 8B (COMPARATIVE EXAMPLE)
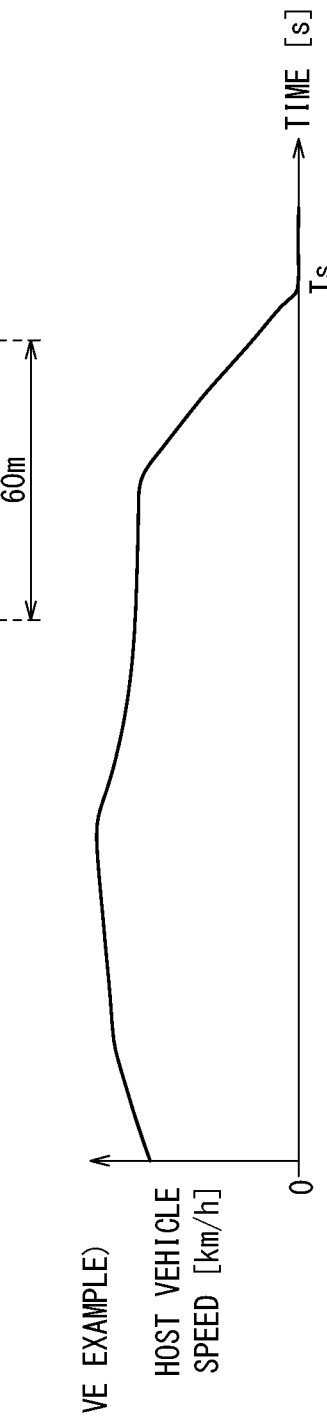
FIG. 8C (COMPARATIVE EXAMPLE)
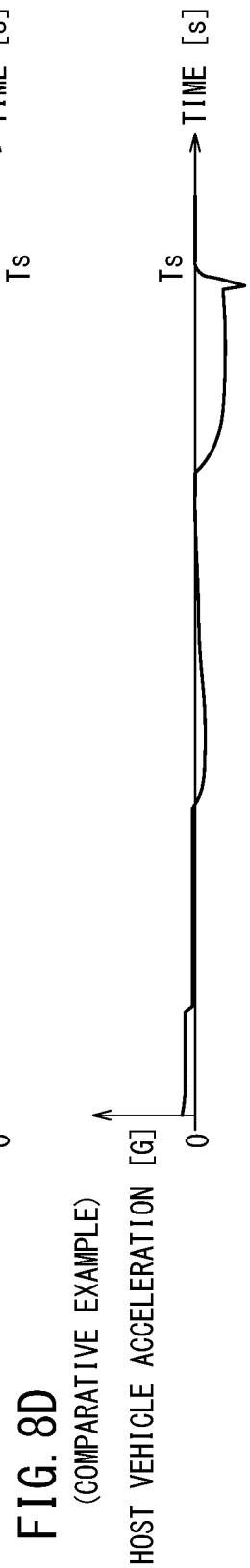
FIG. 8D (COMPARATIVE EXAMPLE)

(REFERENCE EXAMPLE)

(REFERENCE EXAMPLE)

(REFERENCE EXAMPLE)

(REFERENCE EXAMPLE)

VEHICLE CONTROL APPARATUS

TECHNICAL FIELD

The present invention relates to a vehicle control device (apparatus) for performing travel control of a host vehicle at least partially automatically.

BACKGROUND ART

Conventionally, a vehicle control device for performing travel control of a host vehicle at least partially automatically has been known. For example, in consideration of the relationship with preceding another vehicle ahead of the host vehicle, various driving assist techniques or automated driving techniques for smooth traveling of the host vehicle have been developed.

In Japanese Patent No. 4366419 (FIG. 11, etc.), a device of controlling a position of a host vehicle is proposed. At the time of lane change from a lane on which the host vehicle is traveling to an adjacent lane, the device controls the position of the host vehicle according to a spring-mass-damper model in consideration of the relationship with other vehicles traveling on the adjacent lane.

SUMMARY OF INVENTION

In this regard, in the case of applying this spring-mass-damper model to following control, when the travel behavior of the preceding other vehicle is changed rapidly, the responsive to the change becomes relatively low disadvantageously. Specifically, in the middle of traveling of the host vehicle and the other vehicle while maintaining a fixed speed and a fixed inter-vehicle distance, if the other vehicle starts deceleration rapidly, deceleration operation of the host vehicle tends to be delayed.

The present invention has been made to solve the above problem, and an object of the present invention is to provide a vehicle control device in which, even if travel behavior of another vehicle traveling ahead of the host vehicle changes rapidly, it is possible to handle the change with high responsiveness.

A vehicle control device of the present invention performs travel control of a host vehicle at least partially automatically. The vehicle control device includes an external environment state detection unit configured to detect an external environment state of the host vehicle, a travel control unit configured to perform following control with respect to another vehicle detected ahead of the host vehicle by the external environment state detection unit, and a following variable generating unit configured to generate a following variable regarding the following control, wherein the following variable generating unit is configured to calculate a predictive position of the other vehicle at a predictive time point from current time point, set a target position before the predictive position by a target inter-vehicle distance, and determine a first following variable which allows the host vehicle to reach the target position at the predictive time point.

As described above, since the target position is set before the predictive position of the other vehicle by the target inter-vehicle distance, and the first following variable which allows the host vehicle to reach the target position at the predictive time point from the current time point is determined, it becomes possible to perform the following control which achieves the inter-vehicle distance equal to the target inter-vehicle distance at a future specific time point regardless of the travel behavior of the other vehicle. Accordingly, even in the case where the travel behavior of the other preceding vehicle changes rapidly, it is possible to handle the change with high responsiveness.

Further, the following variable generating unit may be configured to determine a second following variable based on a vehicle behavior model which is different from the first following variable, and generate the following variable by performing a computation process having inputs of at least the first following variable and the second following variable. In this manner, it becomes possible to compromise two different levels of responsiveness depending on the vehicle behavior model, and improve the flexibility in the optimization design regarding the following control.

Further, the following variable generating unit is configured to determine the second following variable based on a spring-mass-damper model as the vehicle behavior model. The spring-mass-damper model has an advantage in that the responsiveness to handle the other vehicle becomes relatively high when the host vehicles approaches the other vehicle from a remote position away from the other vehicle by a distance significantly larger than the target inter-vehicle distance. That is, it is possible to perform the following control which offers this advantage.

Further, the following variable generating unit may be configured to generate the following variable by performing a minimum value computation process.

Further, the following variable generating unit may be configured to generate the following variable by performing the computation process in a different manner depending on a travel scene of the host vehicle.

Further, the following variable generating unit may be configured to generate at least one of a speed, an acceleration, and a jerk of the host vehicle, as the following variable.

In the vehicle control device according to the present invention, even in the case where the travel behavior of the preceding other vehicle changes rapidly, it is possible to handle the change with high responsiveness.

BRIEF DESCRIPTION OF DRAWINGS

FIGS. 8A, 8B, 8C, and 8D are views showing the results of performing following control based on the spring-mass-damper model;

DESCRIPTION OF EMBODIMENTS

Hereinafter, a preferred embodiment of a vehicle control device according to the present invention will be described with reference to the accompanying drawings.

[Configuration of Vehicle Control Device 10]

<Overall Configuration>

Figure 1:
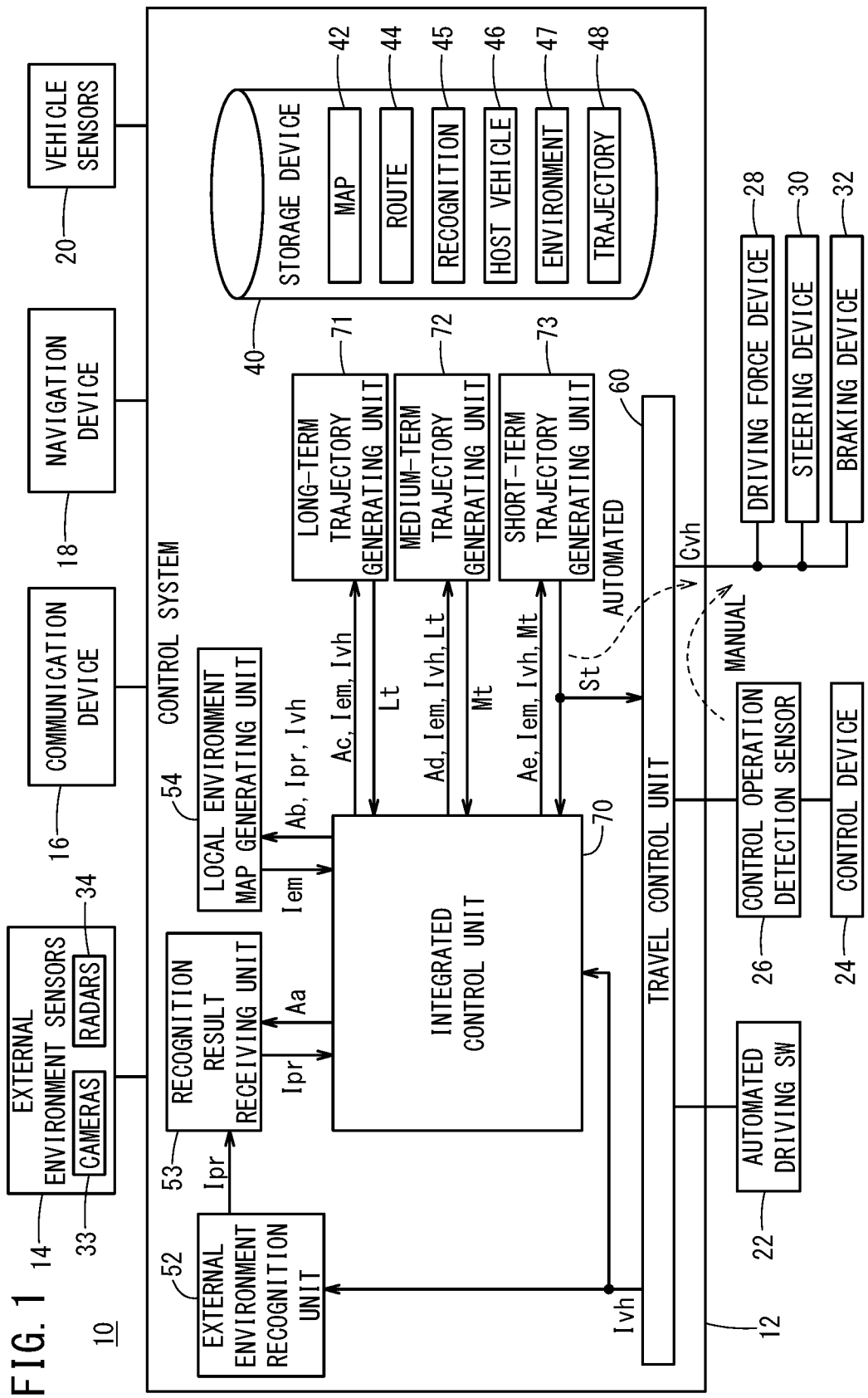
FIG. 1 is a block diagram showing configuration of a vehicle control device according to one embodiment of the present invention.

FIG. 1 is a block diagram showing configuration of a vehicle control device 10 according to one embodiment of the present invention. The vehicle control device 10 is incorporated into a vehicle (host vehicle 110 of FIG. 5), and performs travel control of the vehicle automatically or manually. The concept of this "automated driving" not only includes "complete automated driving" where travel control of the vehicle is performed entirely automatically but also includes "partial automated driving" (or driving assistance) where travel control is performed partially automatically.

Basically, the vehicle control device 10 includes an input system device group, a control system 12, and an output system device group. Each of the devices of the input system device group and the output system device group is connected to the control system 12 through a communication line.

The input system device group includes external environment sensors 14, a communication device 16, a navigation device 18, vehicle sensors 20, an automated driving switch 22, and a control operation detection sensor 26 connected to a control device 24. The output system device group includes a driving force device 28 for driving vehicle wheels, a steering device 30 for steering the vehicle wheels, and a braking device 32 for braking the vehicle wheels.

<Specific Configuration of Input System Device Group>

The external environment sensors 14 include a plurality of cameras 33 and a plurality of radars 34 for obtaining information indicating the external environment state of the vehicle (hereinafter referred to as the external environment information), and outputs the obtained external environment information to the control system 12. Further, the external environment sensors 14 may include a plurality of LIDARs (Light Detection and Ranging/Laser Imaging Detection and Ranging).

The communication device 16 is capable of communicating with external devices including roadside units, other vehicles, and a server. For example, the communication device 16 transmits, and receives information related to traffic devices, information related to other vehicles, probe information, or the latest map information. It should be noted that the map information is stored in the navigation device 18, and stored as map information, in a map information storage unit 42 of a storage device 40.

The navigation device 18 includes a satellite positioning device capable of detecting the current position of the vehicle, and a user interface (e.g., a touch screen display, a speaker, and a microphone). The navigation device 18 calculates a route to a designated destination based on the current position of the vehicle or a position designated by the user, and outputs the calculated route to the control system 12. The route calculated by the navigation device 18 is stored as route information, in a route information storage unit 44 of the storage device 40.

The vehicle sensors 20 include a speed sensor for detecting the speed of the vehicle (vehicle speed), a vertical acceleration sensor for detecting so called a vertical acceleration, a lateral acceleration sensor for detecting so called a lateral acceleration, a yaw rate sensor for detecting angular speed about the vertical axis, a direction sensor for detecting orientation/direction, and a gradient sensor for detecting gradient, and the vehicle sensors 20 output detection signals from the respective sensors to the control system 12. These detection signals are stored as host vehicle state information Ivh in a host vehicle state information storage unit 46 of the storage device 40.

The control device 24 is configured by including an accelerator pedal, a steering wheel, a brake pedal, a shift lever, and a direction indication lever. The control operation detection sensor 26 for detecting the presence/absence of control operation by a driver, an operation amount of the control operation, and an operation position of the control operation is attached to the control device 24.

The control operation detection sensor 26 outputs an accelerator depression amount (acceleration opening angle), a steering wheel operation amount (steering amount), a brake depression amount, a shift position, a right or left turn direction, etc., to a travel control unit 60.

The automated driving switch 22 comprises a hard switch or a soft switch, and the automated driving switch 22 is configured to be capable of switching a plurality of driving modes including the "automated driving mode" and the "manual driving mode" by manual control operation of a user.

The automated driving mode is a driving mode where the vehicle travels under control of the control system 12 while the driver does not perform control operation of the control device 24 (specifically, an accelerator pedal, a steering wheel, and a brake pedal). Stated otherwise, the automated driving mode is a driving mode where the control system 12 controls some of, or all of the driving force device 28, the steering device 30, and the braking device 32 based on action plans which are determined sequentially (in a short term, a short-term trajectory St described later).

It should be noted that in the case where the driver started control operation of the control device 24 during the automated driving mode, the automated driving mode is released automatically, and switched to the driving mode (including the manual driving mode) where the level of driving automation is relatively low.

<Specific Configuration of Output System Device Group>

The driving force device 28 includes a driving force control ECU (Electronic Control Unit), and a drive source including an engine and/or a traction motor. The driving force device 28 generates a travel driving force (torque) for allowing the vehicle to travel in accordance with a vehicle control value Cvh input from the travel control unit 60, and transmits the travel driving force to the vehicle wheels through a transmission, or directly.

The steering device 30 includes an EPS (electric power steering system) ECU, and an EPS device. The steering device 30 changes the orientation of the vehicle wheels (steered wheels) in accordance with the vehicle control value Cvh input from the travel control unit 60.

For example, the braking device 32 is an electric servo brake which uses a hydraulic brake in combination, and the braking device 32 is configured by a braking force control ECU and a brake actuator. The braking device 32 brakes the vehicle wheels in accordance with the vehicle control value Cvh input from the travel control unit 60.

<Configuration of Control System 12>

A function realizing unit of the control system 12 is a software function unit where one or a plurality of CPUs (Central Processing Unit) executes programs stored in a non-transitory storage medium (e.g., the storage device 40) to realize functions. Alternatively, the function realizing unit may be a hardware function unit configured by an integrated circuit such as an FPGA (Field-Programmable Gate Array).

The control system 12 includes, in addition to the storage device 40 and the travel control unit 60, an external environment recognition unit 52, a recognition result receiving unit 53, a local environment map generating unit 54, an integrated control unit 70, a long-term trajectory generating unit 71, a medium-term trajectory generating unit 72, and a short-term trajectory generating unit 73. In this regard, the integrated control unit 70 controls task synchronization of the recognition result receiving unit 53, the local environment map generating unit 54, the long-term trajectory generating unit 71, the medium-term trajectory generating unit 72, and the short-term trajectory generating unit 73 to perform comprehensive control of these units.

The external environment recognition unit 52 refers to the host vehicle state information Ivh from the travel control unit 60, and uses various items of information input from the input system device group (e.g., external environment information from the external environment sensors 14), to recognize sign objects such as lane marks, stop lines, traffic signals, etc., and thereafter, generates "static" external environment recognition information including positional information of sign objects or travel capable areas of the vehicle. Further, the external environment recognition unit 52 generates "dynamic" external environment recognition information including obstacles such as parking and stopping vehicles, traffic participants such as people and/or other vehicles, or light colors of traffic signals.

It should be noted that the static and dynamic recognition information are stored respectively, as external recognition information Ipr in an external environment recognition information storage unit 45 of the storage device 40.

In response to a computation command Aa, the recognition result receiving unit 53 outputs external environment recognition information Ipr received in a predetermined computation cycle Toc together with a count value of an update counter, to the integrated control unit 70. The computation cycle Toc is a computation cycle of a reference within the control system 12. For example, the computation cycle Toc is set to a value of about several tens ms.

In response to the computation command Ab from the integrated control unit 70, the local environment map generating unit 54 refers to the host vehicle state information Ivh and the external environment recognition information Ipr, generates the local environment map information Iem within the computation cycle Toc, and outputs the local environment map information Iem together with a counter value of an update counter, to the integrated control unit 70. That is, at the time of starting control, the computation cycle 2×Toc is required before the local environment map information Iem is generated.

The local environment map information Iem is information in the form of a map, about travel environment of vehicles. Specifically, the local environment map information Iem is formed by combining the host vehicle state information Ivh and an ideal traveling route with the external environment recognition information Ipr. The local environment map information Iem is stored in a local environment map information storage unit 47 of the storage device 40.

In response to the computation command Ac from the integrated control unit 70, the long-term trajectory generating unit 71 generates a long-term trajectory Lt in the relatively longest computation period (e.g., 9×Toc) with reference to the local environment map information Iem (using static components in the external environment recognition information Ipr), the host vehicle state information Ivh, and a road map (curvature of a curve, etc.) stored in the map information storage unit 42. Then, the long-term trajectory generating unit 71 outputs the generated long-term trajectory Lt to the integrated control unit 70 together with a counter value of the update counter. It should be noted that the long-term trajectory Lt is stored as trajectory information Ir, in a trajectory information storage unit 48 of the storage device 40.

In response to the computation command Ad from the integrated control unit 70, the medium-term trajectory generating unit 72 generates a medium-term trajectory Mt in a relatively middle computation period (e.g., 3×Toc) with reference to the local environment map information Iem (using both of static and dynamic components in the external environment recognition information Ipr), the host vehicle state information Ivh, and the long-term trajectory Lt. Further, the medium-term trajectory generating unit 72 outputs the generated trajectory Mt together with the counter value of the update counter, to the integrated control unit 70. It should be noted that, in the same manner as the long-term trajectory Lt, the medium-term trajectory Mt is stored as the trajectory information Ir, in the trajectory information storage unit 48 of the storage device 40.

In response to the computation command Ae from the integrated control unit 70, the short-term trajectory generating unit 73 generates a short-term trajectory St in the relatively longest computation period (e.g., Toc) with reference to the local environment map information Iem (using both of static and dynamic components in the external environment recognition information Ipr), host vehicle state information Ivh, and the medium-term trajectory Mt. Then, the short-term trajectory generating unit 73 outputs the generated short term St together with the counter value of the update counter, to the integrated control unit 70 and the travel control unit 60 at the same time. It should be noted that, as in the case of the long-term trajectory Lt and the medium-term trajectory Mt, the short-term trajectory St is stored as the trajectory information Ir, in the trajectory information storage unit 48.

The long-term trajectory Lt indicates a trajectory in a travel time period of, e.g., about 10 seconds, and ride comfort and amenity are prioritized in the long-term trajectory Lt. Further, the short-term trajectory St indicates a trajectory in a travel time period of, e.g., about 1 second, and realization of vehicle dynamics and high safety are prioritized in the short-term trajectory St. Further, the medium-term trajectory Mt indicates a trajectory in a travel time period of, e.g., about 5 seconds, and the medium-term trajectory Mt is an intermediate trajectory between the long-term trajectory Lt and the short-term trajectory St.

The short-term trajectory St corresponds to data set indicating the travel trajectory (i.e., time series of the target behavior) of the vehicle for every short cycle Ts (=Toc). For example, the short trajectory St is a trajectory plot (x, y, θz, V, G, ρ, γ, δst) in the data units of the position x in the vertical direction (X axis), the position y in the horizontal direction (Y axis), the attitude angle θz (yaw angle), the speed V, the acceleration G, the curvature ρ, the yaw rate γ, and the steering angle δst. Further, though the long-term trajectory Lt and the medium-term trajectory Mt have different cycles, these are data sets defined in the same manner as the short trajectory St.

The travel control unit 60 determines each vehicle control value Cvh for performing travel control of the vehicle, in accordance with the travel behavior (time series of the target behaviors) specified from the short term trajectory St. Then, the travel control unit 60 outputs each of the obtained vehicle control values Cvh to the driving force device 28, the steering device 30, and the braking device 32. That is, the travel control unit 60 is configured to be capable of performing one or more types of travel control corresponding to each of the values of the short-term trajectory St.

The types of travel condition at the time of lane keep (lane keeping) include constant speed traveling, following traveling, deceleration traveling, curve traveling, or obstacle avoidance traveling. For example, ACC (Adaptive Cruise Control) control is a type of "following control" which allows a vehicle to follow another preceding vehicle while maintaining the inter-vehicle distance at a substantially constant distance (i.e., target inter-vehicle distance).

<Main Characteristics Part>

Figure 2:
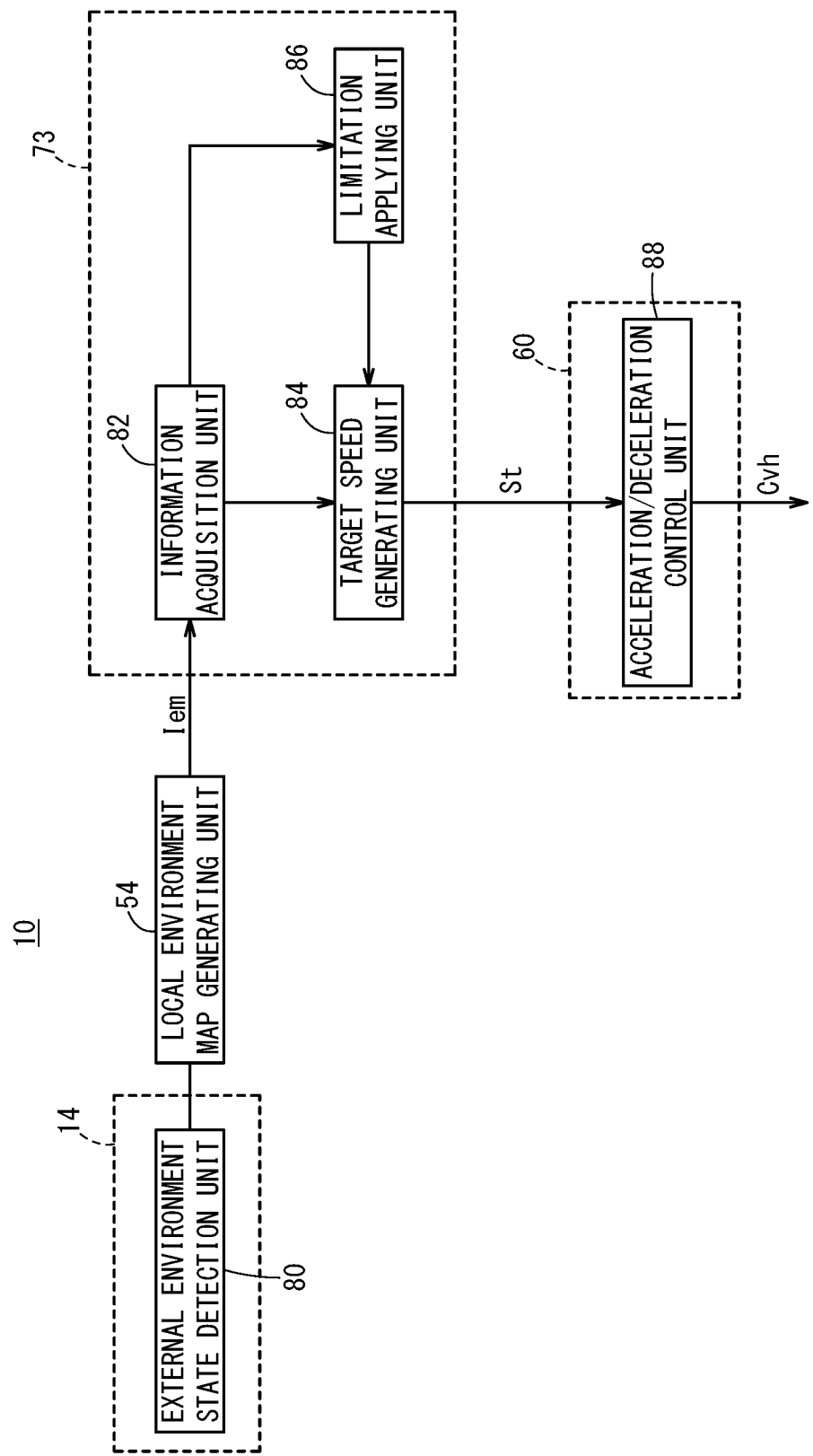
FIG. 2 is a function block diagram showing a main characteristic part in a vehicle control device in FIG. 1.

FIG. 2 is a function block diagram showing a main characteristic part in the vehicle control device 10 in FIG. 1. The vehicle control device 10 includes, in addition to the local environment map generating unit 54 (FIG. 1), an external environment state detection unit 80, an information acquisition unit 82, a target speed generating unit 84, a limitation applying unit 86, and an acceleration/deceleration control unit 88.

The external environment state detection unit 80 corresponds to the external environment sensors 14 shown in FIG. 1. The information acquisition unit 82, the target speed generating unit 84, and the limitation applying unit 86 correspond to the short-term trajectory generating unit 73 shown in FIG. 1. The acceleration/deceleration control unit 88 corresponds to the travel control unit 60 shown in FIG. 1.

Figure 5:
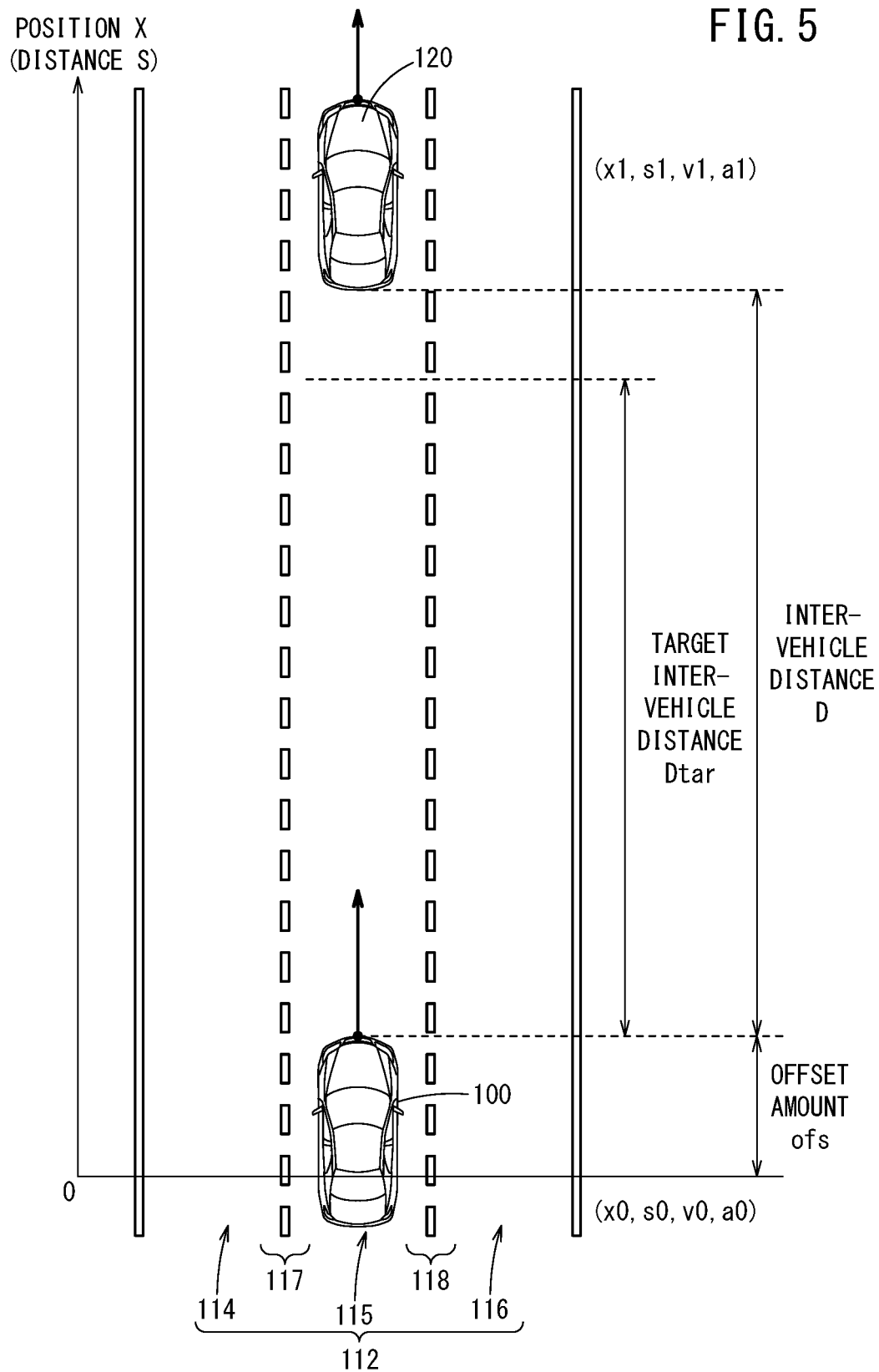
FIG. 5 is a view showing the positional relationship between the host vehicle and another vehicle.

The external environment state detection unit 80 (specifically, cameras 33 or radars 34 in FIG. 1) detects the external environment state of the host vehicle 110 (FIG. 5). For example, using the cameras 33, a captured image including a road 112 (FIG. 5) where the host vehicle 110 is in the middle of traveling is obtained.

The information acquisition unit 82 obtains various items of information used for generation of the short-term trajectory St, from the local environment map information Iem including the detection results by the external environment state detection unit 80. For example, this information includes, in addition to the above host vehicle state information Ivh, lane mark information which makes it possible to identify the shape of lane marks (lane marks 117, 118 in FIG. 5), and other vehicle information which makes it possible to identify the positions and the movement of another vehicle (another vehicle 120 in FIG. 5).

The target speed generating unit 84 generates the short-term trajectory St indicating a time series pattern of a target speed, using various items of information obtained by the information acquisition unit 82. The limitation applying unit 86 sets a time series pattern (hereinafter referred to as a speed limit pattern) of the speed limit using various items of information obtained by the information acquisition unit 82, and outputs the time series pattern to a target speed generating unit 84. That is, the limitation applying unit 86 limits the travel behavior (speed) of the host vehicle 110 by reflecting the speed limit to generation of the short-term trajectory St.

The acceleration/deceleration control unit 88 performs acceleration control or deceleration control of the host vehicle 110 for matching with the target speed generated by the target speed generating unit 84. Specifically, the acceleration/deceleration control unit 88 outputs the speed pattern (vehicle control value Cvh) indicated by the short-term trajectory St to the driving force device 28 or the braking device 32.

<Detailed Block Diagram of Target Speed Generating Unit 84>

Figure 3:
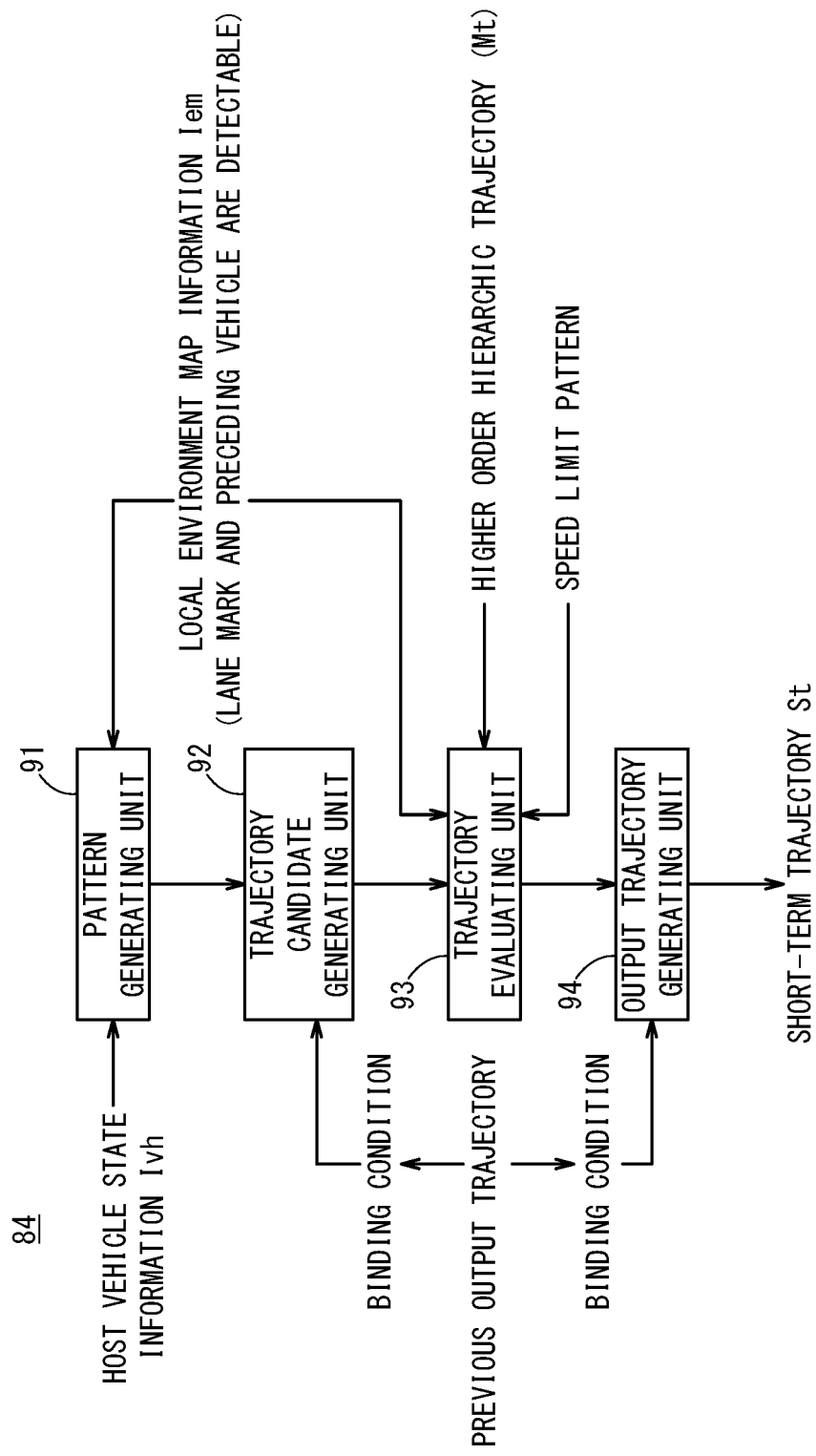
FIG. 3 is a detailed block diagram of a target speed generating unit shown in FIG. 2.

FIG. 3 is a detailed block diagram of the target speed generating unit 84 shown in FIG. 2. The target speed generating unit 84 includes a pattern generating unit 91, a trajectory candidate generating unit 92, a trajectory evaluating unit 93, and an output trajectory generating unit 94.

The pattern generating unit 91 generates a variation group regarding two types of patterns supplied for generation of the short-term trajectory St, using the host vehicle state information Ivh and the local environment map information Iem. Specifically, the pattern generating unit 91 generates variation groups regarding [1] a speed pattern (vertical pattern) indicating time series of the speed V and [2] a steering pattern (lateral pattern) indicating time series of the steering angle δst, respectively.

The trajectory candidate generating unit 92 generates candidates of the short-term trajectory St (hereinafter simply referred to as the "trajectory candidate"), using a variation group of a pattern generated by the pattern generating unit 91. Specifically, the trajectory candidate generating unit 92 combines the speed pattern and the steering angle pattern to generate a large number of trajectory candidates each including time series information of a two dimensional position (x, y). It should be noted that, in the case where the lastly generated short-term trajectory St (hereinafter referred to as the previous output trajectory) is present, a binding condition for achieving consistency with the trajectory may be provided.

The trajectory evaluating unit 93 performs an evaluation process in accordance with a predetermined evaluation standard for each of a large number of trajectory candidates generated by the trajectory candidate generating unit 92. As the evaluation standard, the local environment map information Iem (including detection results of the lane mark and the preceding vehicle) or the higher order hierarchic trajectory (medium-term trajectory Mt) is referred to. It should be noted that the trajectory evaluating unit 93 refers to the speed limit pattern which is set by the limitation applying unit 86 (FIG. 2), and can change the evaluation standard in a manner that the host vehicle 110 travels at speed not more than the speed limit.

Examples of the evaluation approaches include an approach where deviation of one or more variables of the trajectory plot (x, y, θz, V, G, ρ, γ, δst) and the target value (reference value) is determined, this deviation is processed into scores, and the total score is calculated by weighting computation. For example, by relatively increasing the weighting coefficient corresponding to the specific parameters, estimation results which place importance on certain parameters are obtained.

<Detailed Block Diagram of Limitation Applying Unit 86>

Figure 4:
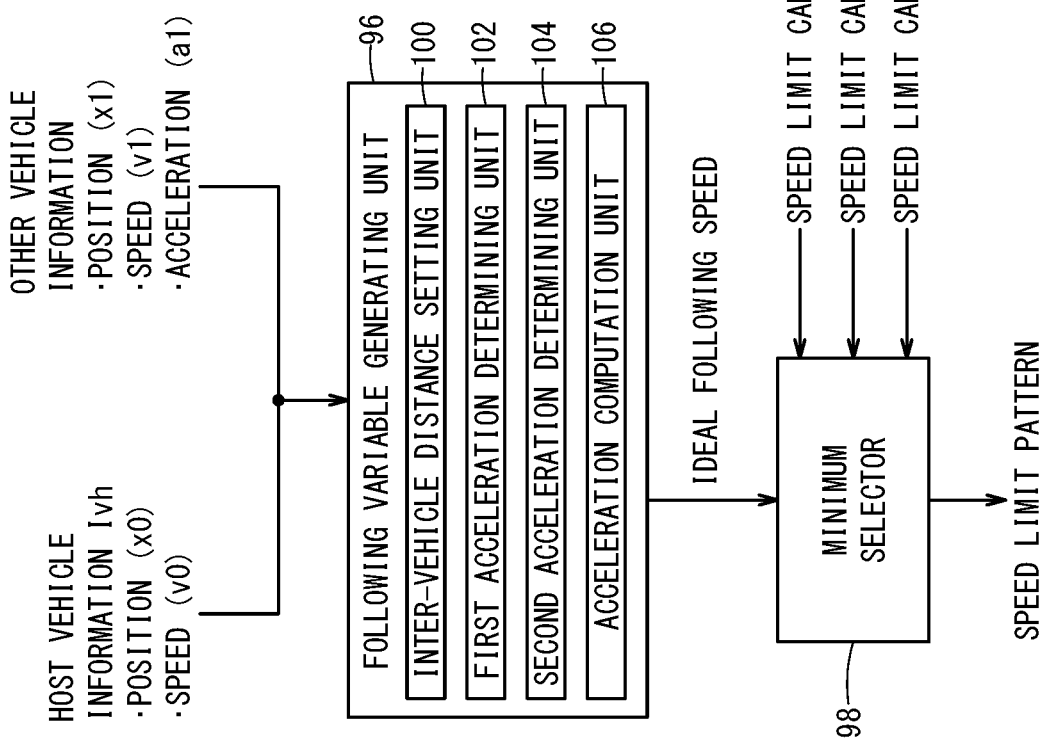
FIG. 4 is a detailed block diagram of a limitation applying unit shown in FIG. 2.

FIG. 4 is a detailed block diagram the limit applying unit 86 shown in FIG. 2. The limit application unit 86 includes a following variable generating unit 96 and a minimum selector 98.

In addition to the host vehicle state information Ivh, the following variable generating unit 96 generates an ideal following variable (e.g., ideal following speed) for following the other vehicle 120, using vehicle information regarding the other vehicle 120 (hereinafter referred to as the other vehicle information). The other vehicle information includes the position, a speed, an acceleration, or a jerk of the other vehicle 120.

The minimum selector 98 selects the ideal following speed generated by the following variable generating unit 96, and the minimum speed among the three types of speed limit candidates A, B, C, and outputs the selected speeds as a speed limit pattern. The speed limit candidate A is an upper limit value of the speed based on law regulations (so called legal speed). The speed limit candidate B is an upper limit value of the speed for maintaining the stable travel behavior, calculated based on the lane curvature. The speed limit candidate C is an upper limit value of the speed at which the vehicle can stop at a predetermined stop position, calculated based on the indication state of the traffic signal and the stop line.

[Operation of Vehicle Control Device 10]

The vehicle control device 10 according to the embodiment of the present invention has the above configuration. Next, operation of the vehicle control device 10 will be described with reference to FIGS. 5 to 7.

FIG. 5 is a view showing the positional relationship between the host vehicle 110 and the other vehicle 120. The host vehicle 110 travels on a substantially straight road 112 having three lanes on each side. Lane marks 117, 118 in the form of broken lines for separating lanes 114, 115, 116 are marked on the road 112.

As can be understood from this drawing, the other vehicle 120 and the host vehicle 110 travel on the same lane 115, and the other vehicle 120 is ahead of the host vehicle 110. In this case, it is assumed that the travel control unit 60 is in the middle of performing following control to follow the other vehicle 120 ahead of the host vehicle 110.

<Step 1. Detection Step>

First, the external environment state detection unit 80 detects the lane marks 117, 118 as stationary objects around the host vehicle 110, and the other vehicle 120 as a moving object around the host vehicle 110. Further, the vehicle control device 10 obtains other vehicle information based on the detection result by the external environment sensors 14 (or from the other vehicle 120 through inter-vehicle communication).

In an example shown in FIG. 5, an X axis is defined along a direction in which the lane 115 extends, i.e., in a direction in which the host vehicle 110 travels. The reference position of the host vehicle 110 (e.g., a center between axles of rear wheels) is an origin point O. It should be noted that in the case where the lane 115 has a straight shape, the distance along the road (S axis) becomes substantially equal to the position on the X axis.

The inter-vehicle distance D is a distance between a front end position (position of a front grill) of the host vehicle 110 and a rear end position of the other vehicle 120. In this regard, the offset quantity ofs is the length from the origin point O to the front end position. Further, the target inter-vehicle distance Dtar is an inter-vehicle distance which is set beforehand by an inter-vehicle distance setting unit 100.

In this regard, the travel position, the distance along the road, the speed, and the acceleration of the host vehicle 110 will be denoted as (x0, s0, v0, a0), respectively. On the other hand, the position, the distance along the road, the speed, and the acceleration of the other vehicle 120 will be denoted as (x1, s1, v1, a1), respectively.

<Step 2. First Determination Step>

Next, a first acceleration determining unit 102 determines travel behavior (first acceleration herein) of the host vehicle 110 based on the first vehicle behavior model. The first vehicle behavior model corresponds to a model of determining travel behavior of the host vehicle 110 to satisfy the inter-vehicle distance D=Dtar when preview time Tp elapses (hereinafter referred to as the preview inter-vehicle model).

Before this determination, the first acceleration determining unit 102 predicts a future position of the other vehicle 120 (hereinafter referred to as a predictive position 132), using the other vehicle information (x1, s1, v1, a1) obtained in detection of step S1. The predictive position 132 corresponds to the position of the other vehicle 120 at the elapse time point of the preview time Tp (freely-selected positive value).

Figure 6:
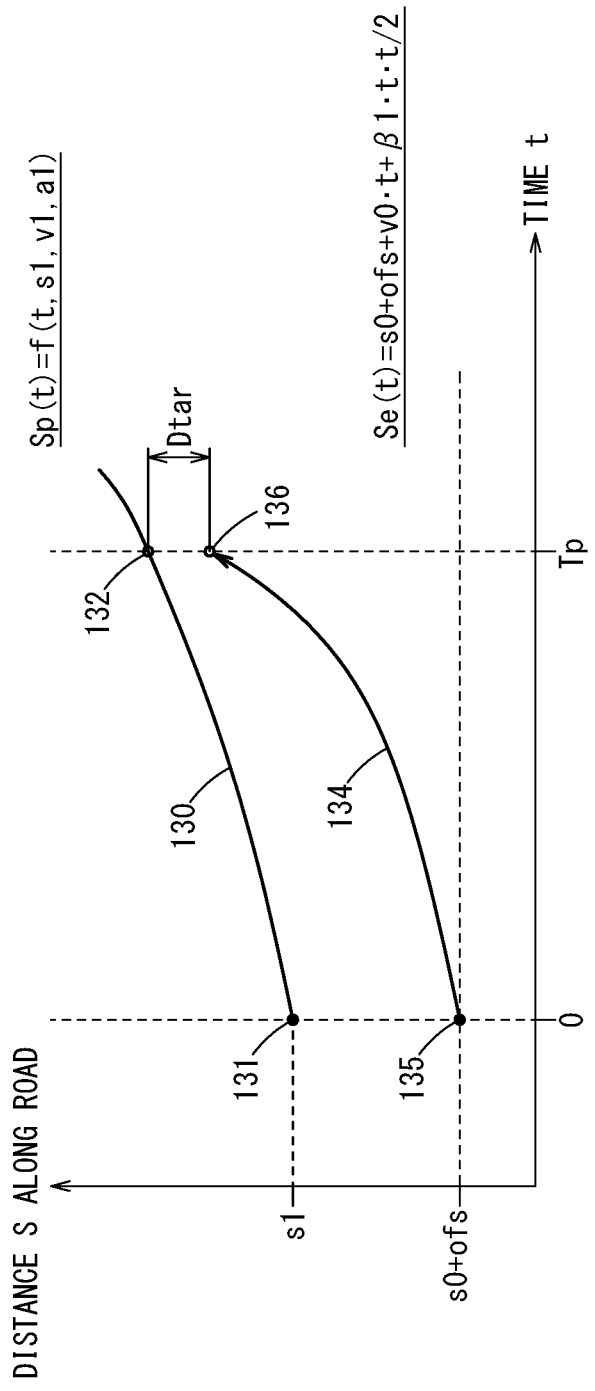
FIG. 6 is a graph showing a method of determining travel behavior in a preview inter-vehicle model.

FIG. 6 is a graph showing a method of determining travel behavior in a preview inter-vehicle model. The horizontal axis of the graph indicates the time t (unit: s), and the vertical axis of the graph indicates the distance s along the road (unit: m).

A prediction curve 130 is a curve indicating the prediction result of the distance Sp(t) along the road of the other vehicle 120. In general, the distance Sp(t) along the road is expressed in the following expression (1), using a freely-selected prediction function f(•)

$$Sp(t)=f(t,s1,v1,a1) \quad (1)$$

One end point of the prediction curve 130 corresponds to the position (s1: hereinafter referred to as other vehicle position 131) of the other vehicle 120 at time t=0. Further, the other end point of the prediction curve 130 corresponds to the position (hereinafter referred to as the predictive position 132) of the other vehicle 120 at time t=Tp.

On the other hand, a target curve 134 is a curve indicating the prediction results of the distance Se(t) along the road of the host vehicle 110. The distance Se(t) along the road is expressed as the following equation (2), using (s0, v0) as known values, and an acceleration β1 (first acceleration) as an unknown value.

$$Se(t)=s0+ofs+v0 \cdot t+\beta 1 \cdot t \cdot t/2 \quad (2)$$

One end point of the target curve 134 corresponds to the position (s0: hereinafter referred to as a host vehicle position 135) of the host vehicle 110 at time t=0. Further, the other end point of the target curve 134 corresponds to the position of the host vehicle 110 at time t=Tp (hereinafter referred to as a target position 136).

Hereinafter, according to the preview inter-vehicle model, it is assumed that the target position 136 is positioned before the predictive position 132 by the target inter-vehicle distance Dtar. In this case, the relationship shown in the following equation (3) is satisfied.

$$Se(Tp)=Sp(Tp)-Dtar \quad (3)$$

Using the equations (1) to (3), the acceleration β1 is calculated from the following equation (4)

$$\beta 1=2 \cdot \{Sp(Tp)-v0 \cdot Tp-\Delta\}/(Tp \cdot Tp) \quad (4)$$

where Δ=Dtar+s0+ofs.

<Step 3. Second Determination Step>

Then, a second acceleration determining unit 104 determines travel behavior of the host vehicle 110 based on the second vehicle behavior model (second acceleration herein).

This second vehicle behavior model corresponds to a spring-mass-damper model where the host vehicle 110 is mass.

Figure 7:
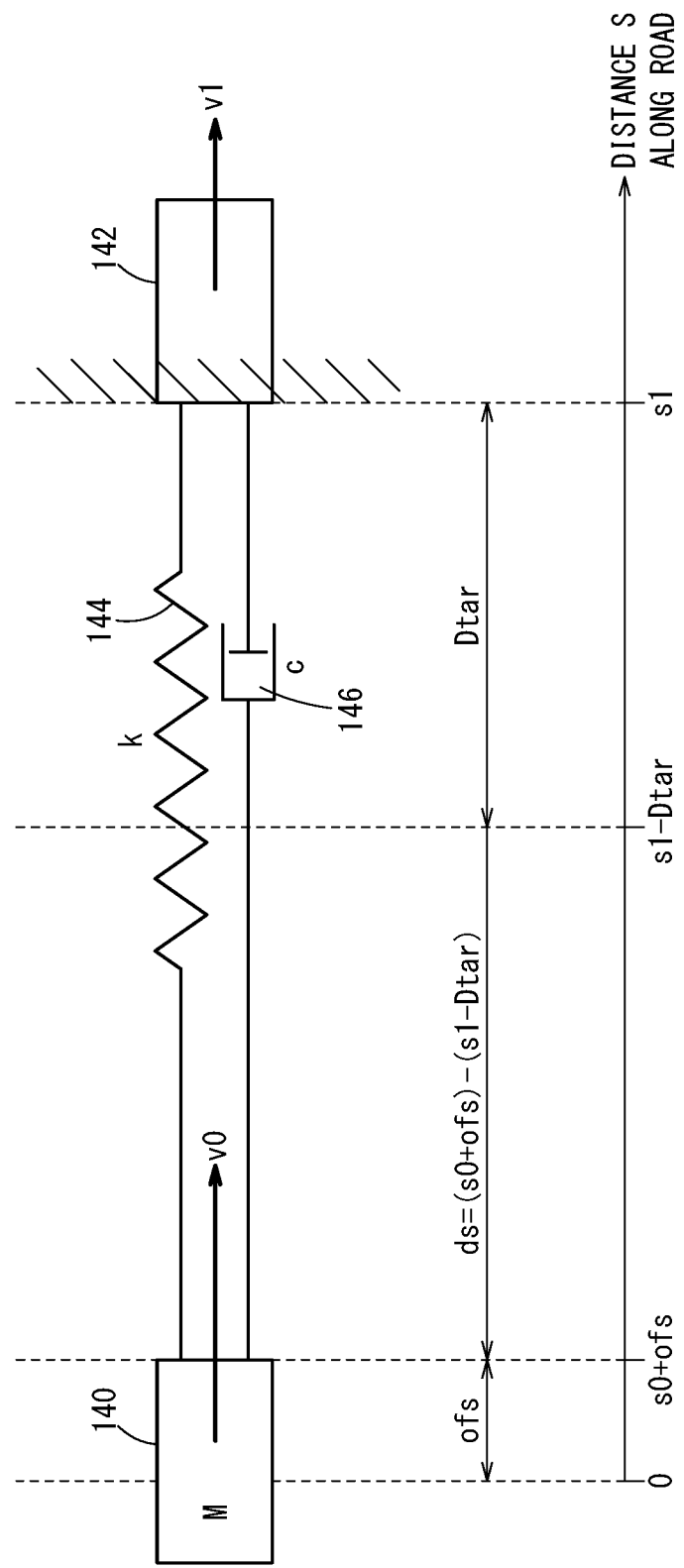
FIG. 7 is a view showing a method of determining travel behavior in a spring-mass-damper model.

FIG. 7 is a view showing a method of determining travel behavior based on the spring-mass-damper model. The horizontal axis of the graph corresponds to the distance s along the road (unit: m). This model describes the positional relationship between a virtual host vehicle 140 (mass M) corresponding to the host vehicle 110 and virtual another vehicle 142 corresponding to the other vehicle 120. A spring 144 (spring constant: k) and a damper 146 (damping coefficient: c) are provided in parallel between the virtual host vehicle 140 and the virtual other vehicle 142.

Assuming that the virtual host vehicle 140 is a free end, and the virtual other vehicle 142 is a fixed end, a motion equation shown by the following equation (5) is obtained, using an acceleration β2 (second acceleration) as an unknown value.

$$M \cdot \beta2 = -k \cdot ds - c \cdot dv \quad (5)$$

where dv=v1−v0, ds=s0+ofs−(s1−Dtar).

By deformation of the equation (5), the acceleration β2 can be calculated from the following equation (6)

$$\beta2 = -k \cdot (\Delta - s1)/M - c \cdot (v1 - v0)/M \quad (6)$$

where Δ=Dtar+s0+ofs.

In this regard, in order to maintain the target inter-vehicle distance Dtar, critical damping (ξ=1) is determined in the design. That is, it should be noted that values of the constants c, k, and M are set in a manner that the relationship shown in the following relationship (7) is satisfied.

$$c = 2\sqrt{(M \cdot k)} \quad (7)$$

<Step 4. Computation Step>

Next, an acceleration computation unit 106 performs a freely-selected computation process using inputs of the acceleration β1 and the acceleration β2 which have been determined in steps in S2, S3, respectively to generate a target acceleration β. For example, the acceleration computation unit 106 performs a minimum value computation process for selecting a smaller value, to output the smaller one Min (β1, β2) of the acceleration β1 and the acceleration β2, as the target acceleration β. The output value of the acceleration computation unit 106 is not limited to the minimum value, and may be a freely-selected composite value including the maximum value, the average value, and the weighted average value.

Further, the acceleration computation unit 106 may perform different computation processes depending on travel scenes of the host vehicle 110. For example, the acceleration computation unit 106 may output only the acceleration β1 (or β2) in the case [1] where the other vehicle 120 starts to move, in the case [2] where the other vehicle 120 is accelerated, or in the case [3] where the other vehicle 120 changes the lane.

Thereafter, the following variable generating unit 96 integrates the target acceleration β obtained by the acceleration computation unit 106 with the time t to generate a speed pattern, and then, outputs the speed pattern as an ideal following speed, to the minimum selector 98.

It should be noted that the following variable generating unit 96 generates an ideal following speed regarding the host vehicle 110, and outputs the ideal following speed. However, the present invention is not limited in this respect. Specifically, the following variable generating unit 96 may generate at least one of the speed, the acceleration, and the jerk of the host vehicle 110, as the following variable.

<Step 5. Travel Control Step>

Finally, the travel control unit 60 continues travel control of the host vehicle 110 under the condition where the speed is limited by the limitation applying unit 86. In this manner, the host vehicle 110 travels to follow the preceding other vehicle 120, while maintaining the inter-vehicle distance D which is equal to the target inter-vehicle distance Dtar at the predictive time point which is set sequentially.

[Result of Following Control]

Next, the result of the following control (operation of the following variable generating unit 96) according to the embodiment of the present invention will be described with reference to FIGS. 8A to 12C.

Example 1: Following Control Based on Acceleration β2 Comparative Example

FIG. 8A to 8D are views showing the result of performing following control based on the spring-mass-damper model. In this case, it is assumed that, when the host vehicle 110 and the other vehicle 120 travel along the lane 115 while maintaining the constant speed and the constant inter-vehicle distance D, the other vehicle 120 starts deceleration suddenly.

FIG. 8A is a view showing the positional relationship between the host vehicle 110 and the other vehicle 120 at the time point (time t=0) when the other vehicle 120 starts deceleration. FIG. 8B is a view showing the positional relationship between the host vehicle 110 and the other vehicle 120 at the time point (time t=Ts) when the host vehicle 110 stops.

FIG. 8C is a graph showing the time change of the speed (host vehicle speed) of the host vehicle 110 in the travel scenes in FIGS. 8A and 8B. The horizontal axis of the graph indicates the time t (unit: s), and the vertical axis of the graph indicates the host vehicle speed (unit: km/h). The definition of this graph is also applicable to graphs of FIGS. 9C, 10C, and 11C described later.

FIG. 8D is a graph showing the time change of acceleration (host vehicle acceleration) of the host vehicle 110 in the travel scenes of FIGS. 8A and 8B. The horizontal axis of the graph indicates the time t (unit: s), and the vertical axis of the graph indicates the host vehicle acceleration (unit: G). The definition of the graph is also applicable to graphs of FIGS. 9D, 10D, 11D described later.

As can be understood from FIGS. 8C and 8D, in the case where the other vehicle 120 starts deceleration suddenly, timing at which the host vehicle 110 starts deceleration is delayed, and the inter-vehicle distance D becomes smaller than the target inter-vehicle distance Dtar=60 [m] when the host vehicle 110 stops (FIG. 8B).

Example 2: Following Control Based on Acceleration β1 and Acceleration β2 (Embodiment Example)

FIGS. 9A to 9D are views showing the results of performing following control (minimum value computation) based on the preview inter-vehicle model and the spring-mass-damper model. The travel scenes are the same as those in the case of FIGS. 8A to 8B.

Figure 9A:
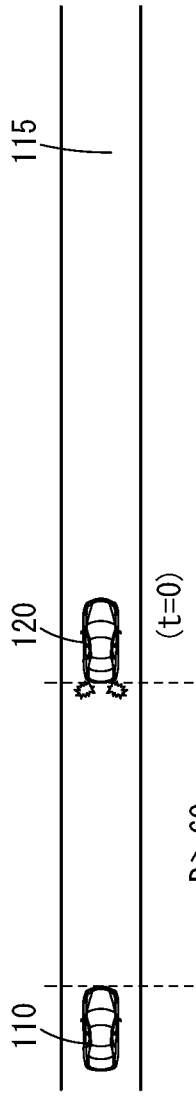
FIGS. 9A, 9B, 9C, and 9D are views showing the results of performing following control based on the preview inter-vehicle model and the spring-mass-damper model.
Figure 9B:
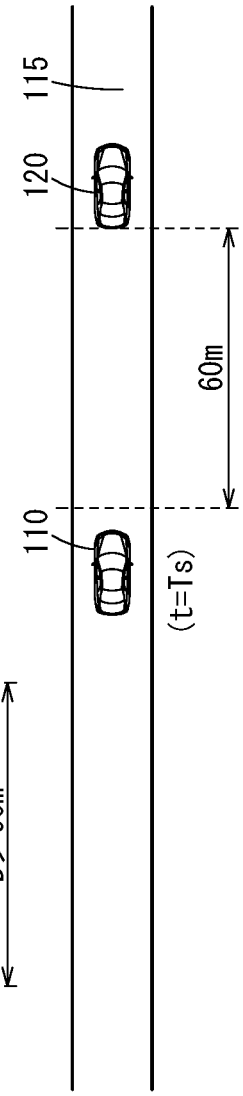

FIG. 9A is a view showing the positional relationship between the host vehicle 110 and the other vehicle 120 at the time point (time t=0) at which the other vehicle 120 starts deceleration. FIG. 9B is a view showing the positional relationship between the host vehicle 110 and the other vehicle 120 at the time point (time t=Ts) at which the host vehicle 110 stops.

Figure 9C:
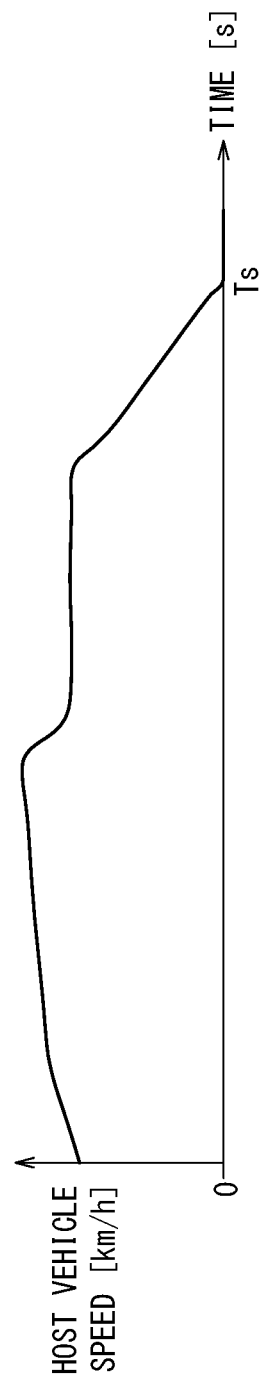
Figure 9D:
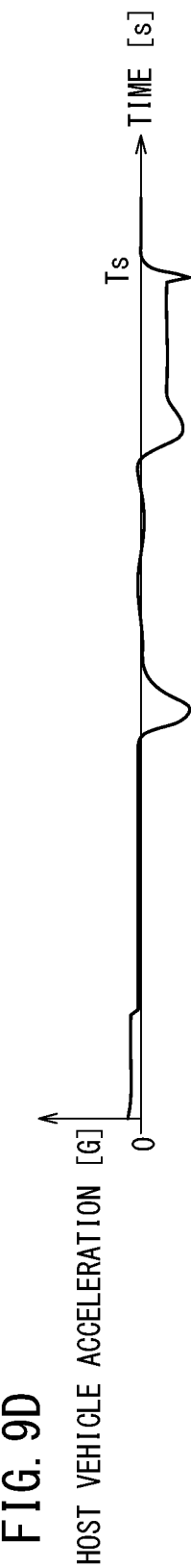

As can be understood from FIGS. 9C and 9D, even in the case where the other vehicle 120 starts deceleration suddenly, the host vehicle 110 starts deceleration operation with high responsiveness, and stops to have an inter-vehicle distance D which is larger than the target inter-vehicle distance Dtar=60 [m] (FIG. 9B).

Example 3: Following Control Based on Acceleration β1 (Reference Example)

FIGS. 10A to 10D are views showing the results of performing following control based on the preview inter-vehicle model. In this regard, it is assumed that, in the state where the other vehicle 120 is stopped on the lane 115, the host vehicle 110 approaches the other vehicle 120 from a remote position away from the other vehicle 120 by a distance significantly larger than the target inter-vehicle distance Dtar.

Figure 10A:
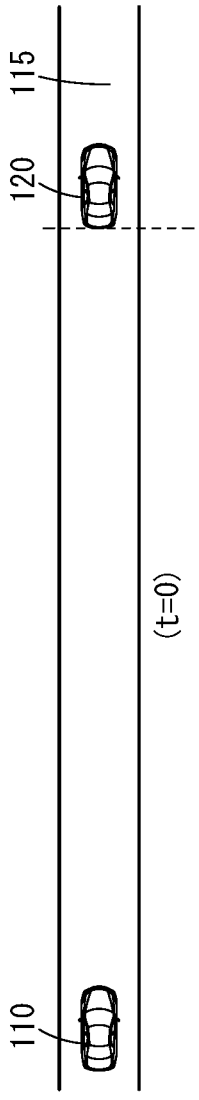
FIGS. 10A, 10B, 10C, and 10D are views showing the results of performing following control based on the preview inter-vehicle model.
Figure 10B:
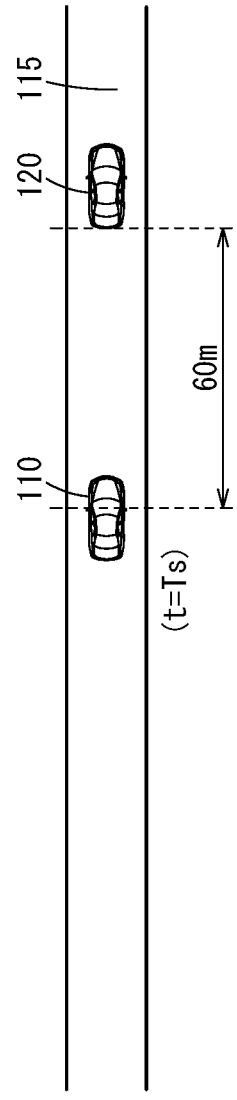

FIG. 10A is a view showing the positional relationship between the host vehicle 110 and the other vehicle 120 at the time point (time t=0) when the host vehicle 110 recognized the other vehicle 120. FIG. 10B is a view showing the positional relationship between the host vehicle 110 and the other vehicle 120 at the time point (time t=Ts) when the host vehicle 110 is stopped.

Figure 10C:
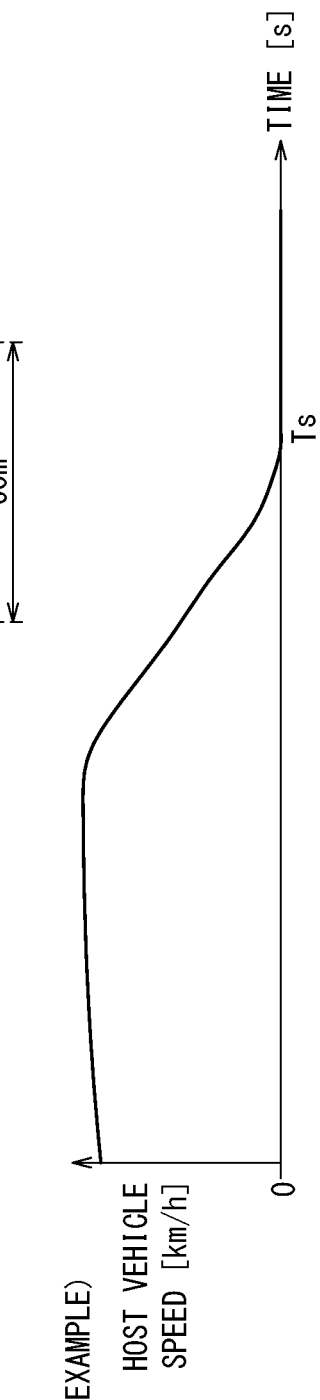
Figure 10D:
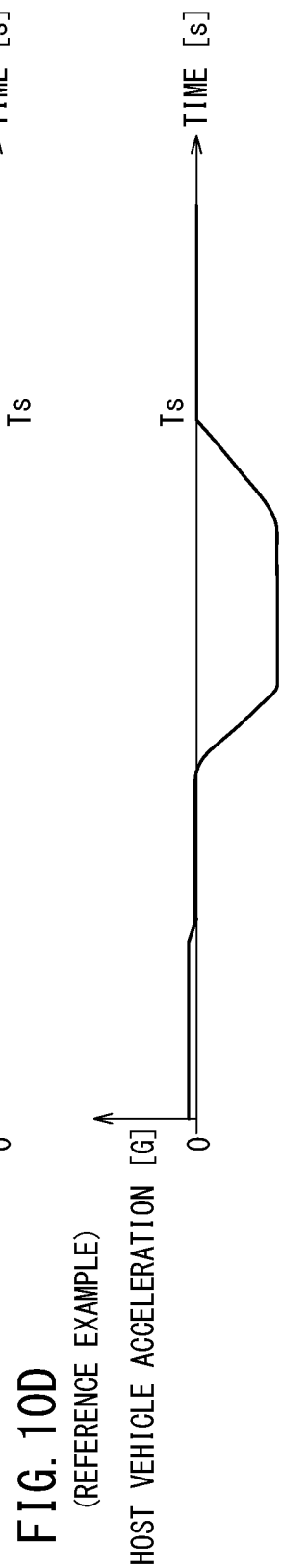

As can be understood from FIGS. 10C and 10D, when the host vehicle 110 moves toward the other vehicle 120 during the stop of the other vehicle 120, the timing at which the host vehicle 110 starts deceleration operation is delayed, and the inter-vehicle distance D becomes smaller than the target inter-vehicle distance Dtar=60 [m] when the host vehicle 110 is stopped (FIG. 10B).

Example 4: Following Control Based on Acceleration β1 and Acceleration β2 (Embodiment Example)

FIGS. 11A to 11D are views showing the results of performing following control based on the preview inter-vehicle model and the spring-mass-damper model (minimum value computation). The travel scenes are the same as those in the case of FIGS. 10A to 10B.

Figure 11A:
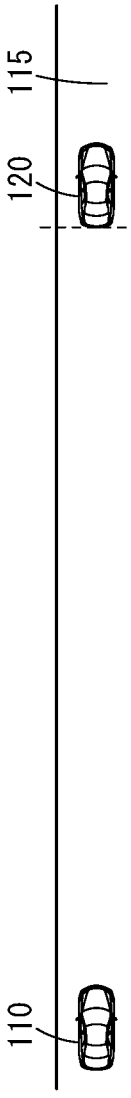
FIGS. 11A, 11B, 11C, and 11D are views showing the results of performing following control based on the preview inter-vehicle model and the spring-mass-damper model.
Figure 11B:
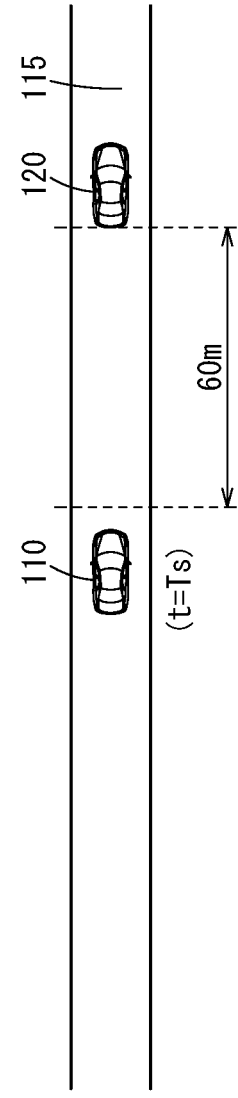
Figure 11C:
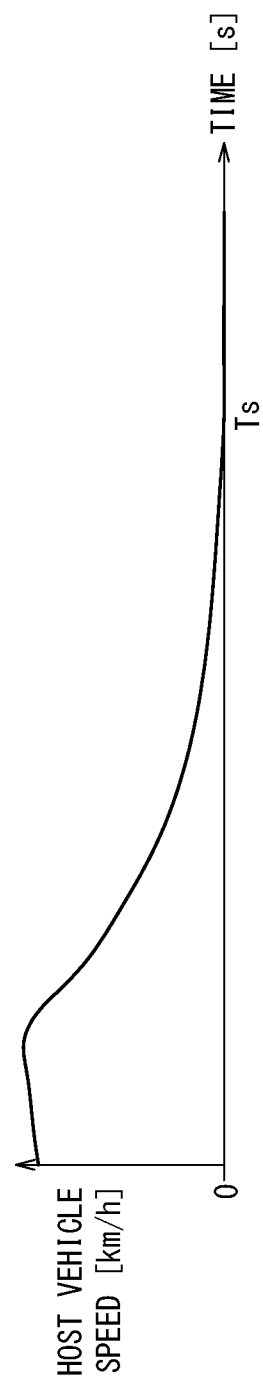
Figure 11D:
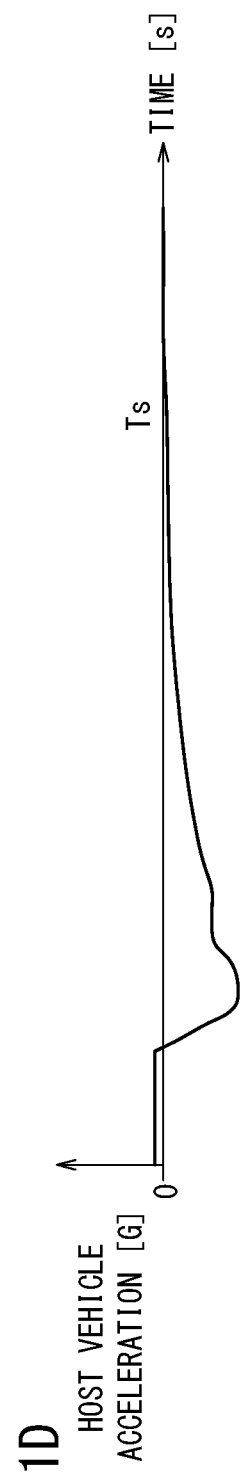

As can be understood from FIGS. 11C and 11D, even in the case where the host vehicle approaches the other vehicle 120 during the stop of the other vehicle 120, the host vehicle 110 starts deceleration operation with high responsiveness, and stops with the inter-vehicle distance D which is larger than the target inter-vehicle distance Dtar=60 [m] (FIG. 11B).

Example 5: Following Control Based on Acceleration β1 and Acceleration β2 (Embodiment Example)

Figure 12A:
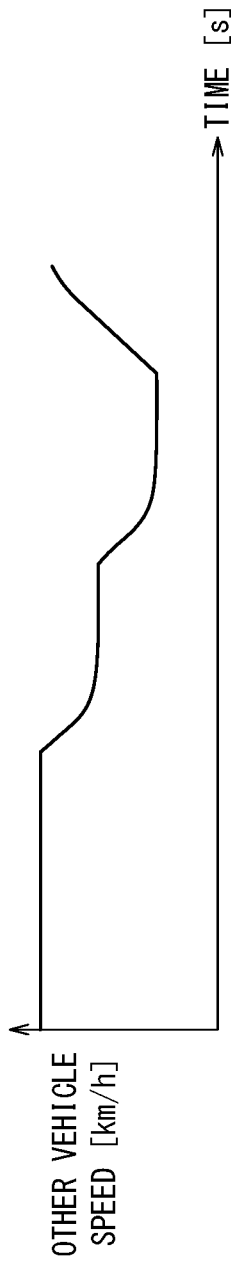
FIGS. 12A, 12B, and 12C are graphs showing the results of performing following control based on the preview inter-vehicle model and the spring-mass-damper model.
Figure 12B:
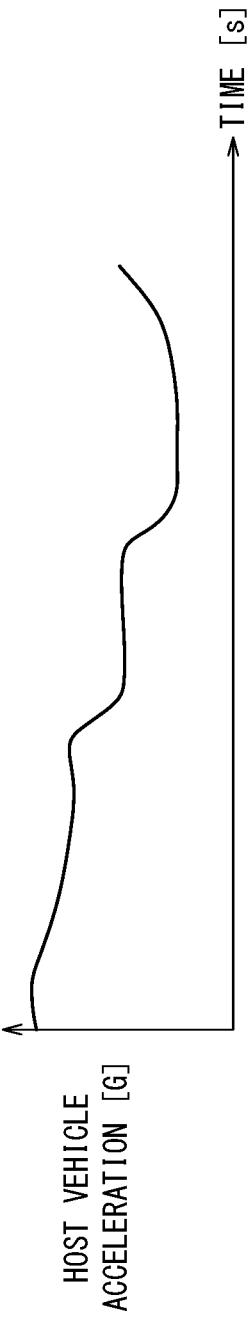
Figure 12C:
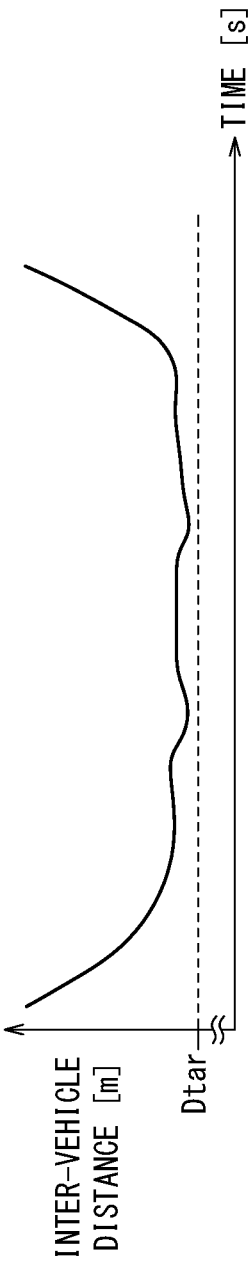

FIGS. 12A to 12C are graphs showing the results of performing following control (minim value computation) based on the preview inter-vehicle model and the spring-mass-damper model. In this case, it is assumed that the travel behavior of the other vehicle 120 is changed during traveling of the host vehicle 110 and the other vehicle 120 on the lane 115 while maintaining the constant speed and the constant inter-vehicle distance D.

FIG. 12A is a graph showing the time change of the speed of the other vehicle 120 (other vehicle speed). The horizontal axis of the graph indicates the time t (unit: s), and the vertical axis of the graph indicates the other vehicle speed (unit: km/h). This graph shows a travel pattern of the other vehicle 120 that performs constant speed traveling, deceleration operation, constant speed traveling, deceleration operation, constant speed traveling, and acceleration operation successively.

FIG. 12B is a graph showing the time change of the speed of the host vehicle 110 (host vehicle speed). The horizontal axis of the graph indicates the time t (unit: s), and the vertical axis of the graph indicates the host vehicle speed (unit: km/h).

FIG. 12C is a graph showing the time change of the inter-vehicle distance D between the host vehicle 110 and the other vehicle 120. The horizontal axis of the graph the time t (unit: s), and the vertical axis of the graph indicates the inter-vehicle distance D (unit: m). As can be understood from FIGS. 12B and 12C, the host vehicle 110 performs operation following the travel pattern of the other vehicle 120 while maintaining the relationship of D>Dtar all the time.

[Advantages of Vehicle Control Device 10]

As described above, the vehicle control device 10 performs travel control of the host vehicle 110 at least partially automatically. The vehicle control device 10 includes [1] the external environment state detection unit 80 configured to detect an external environment state of the host vehicle 110, [2] the travel control unit 60 configured to perform following control with respect to another vehicle 120 detected ahead of the host vehicle 110, and [3] the following variable generating unit 96 configured to generate a following variable regarding the following control.

Further, a vehicle control method using the vehicle control device 10 is a method of performing travel control of the host vehicle 110 at least partially automatically. One or a plurality of computers perform [1] a detection step of detecting an external environment state of the host vehicle 110, [2] a control step which makes it possible to perform following control with respect to the other vehicle 120 detected ahead of the host vehicle 110, and [3] a generation step of generating a following variable regarding the following control.

Further, the following variable generating unit 96 is configured to: [4] calculate the predictive position 132 of the other vehicle 120 at a predictive time point (t=Tp) from the current time point (t=0); [5] set the target position 136 before the predictive position 132 by the target inter-vehicle distance Dtar; and [6] determine the first following variable (e.g., acceleration β1) which allows the host vehicle 110 to reach the target position 136 at the predictive time point (t=Tp).

As described above, since the target position 136 is set before the predictive position 132 of the other vehicle 120 by the target inter-vehicle distance Dtar, and the first following variable which allows the host vehicle 110 to reach the target position 136 at the predictive time point (t=Tp) is determined, it becomes possible to perform the following control which achieves the inter-vehicle distance D equal to the target inter-vehicle distance Dtar at a future specific time point (t=Tp) regardless of the travel behavior of the other vehicle 120. Therefore, even in the case where the travel behavior of the preceding other vehicle 120 is changed rapidly, it is possible to handle the change with high responsiveness.

Further, the following variable generating unit 96 may be configured to: determine the second following variable (e.g., acceleration β2) based on the vehicle behavior model which is different from the first following variable; and generate the following variable (target acceleration β) by performing a computation process having inputs of at least the first following variable and the second following variable. In this manner, it becomes possible to make a compromise between two different levels of responsiveness depending on the vehicle behavior models, and increases the flexibility in optimizing design regarding following control.

Further, the following variable generating unit 96 may be configured to determine the second following variable based on the spring-mass-damper model as the vehicle behavior model. The spring-mass-damper model has an advantage in that the responsiveness to handle the other vehicle 120 becomes relatively high when the host vehicles 110 approaches the other vehicle 120 from a remote position away from the other vehicle 120 by a distance significantly larger than the target inter-vehicle distance Dtar. That is, it is possible to perform the following control which offers this advantage.

[Supplementation]

It should be noted that the present invention is not limited to the above described embodiment. It is a matter of course that modifications can be made freely without departing from the gist of the present invention. Alternatively, any of the respective configurations may be combined together as long as such combination does not involve any technical contradictions.

The invention claimed is:

1. A vehicle control device for performing travel control of a host vehicle at least partially automatically;

the vehicle control device comprising:
an external environment state detection unit configured to detect an external environment state of the host vehicle;
a travel control unit configured to perform following control with respect to another vehicle detected ahead of the host vehicle by the external environment state detection unit; and
a following variable generating unit configured to generate a third following variable regarding the following control,
wherein the following variable generating unit is configured to:
calculate a predictive position of the other vehicle at a predictive time point from current time point;
set a target position before the predictive position by a target inter-vehicle distance; and
determine a first following variable which allows the host vehicle to reach the target position at the predictive time point
determine a second following variable based on a spring-mass-damper model which is different from the first following variable,
generate the third following variable by performing a computation process having inputs of at least the first following variable and the second following variable, and
generate the third following variable by performing the computation process having input only of the first following variable in a case where a travel scene of the host vehicle is a scene of starting of the other vehicle, a scene of acceleration of the other vehicle, or a scene of lane change of the other vehicle.

2. The vehicle control device according to claim 1, wherein the following variable generating unit is configured to generate the third following variable by performing a minimum value computation process.

3. The vehicle control device according to claim 1, wherein the following variable generating unit is configured to generate at least one of a speed, an acceleration, and a jerk of the host vehicle, as the third following variable.

4. The vehicle control device according to claim 1, further comprising a minimum selector having a plurality of speed limit candidates, wherein
the minimum selector is configured to select as the third following variable a minimum speed among a speed in the first following variable and the plurality of speed limit candidates.

5. The vehicle control device according to claim 4, wherein the plurality of speed limit candidates include an upper limit value of a speed based on law regulations, and upper limit value of a speed for maintaining stable travel behavior or an upper limit value of a speed at which the host vehicle can stop at a predetermined stop position.

* * * * *